INVENTORS
JOHN J. KAWECKA
BY E. HAROLD MUMFORD
D. T. INNIS
S. R. NELSON
ATTORNEYS

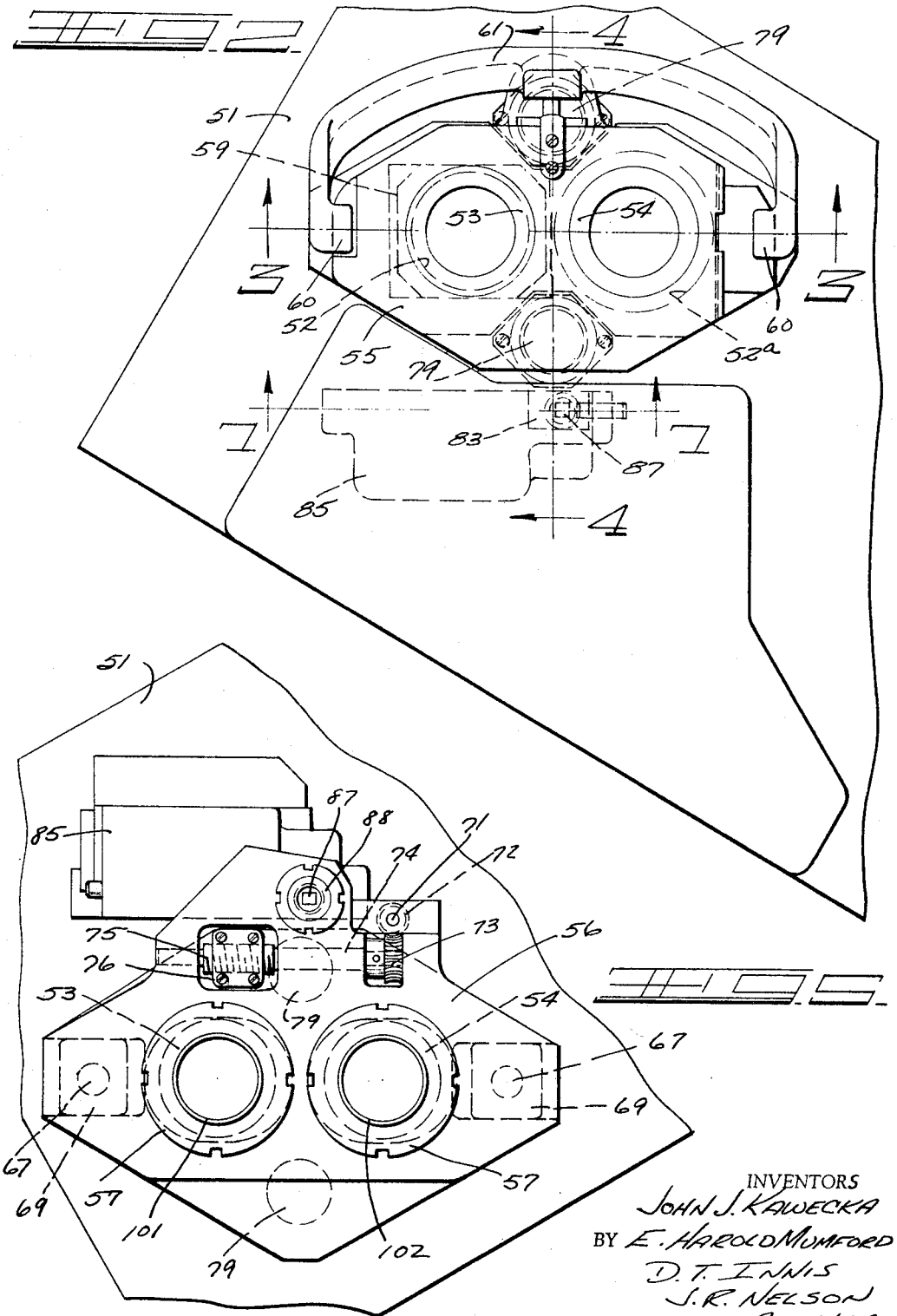

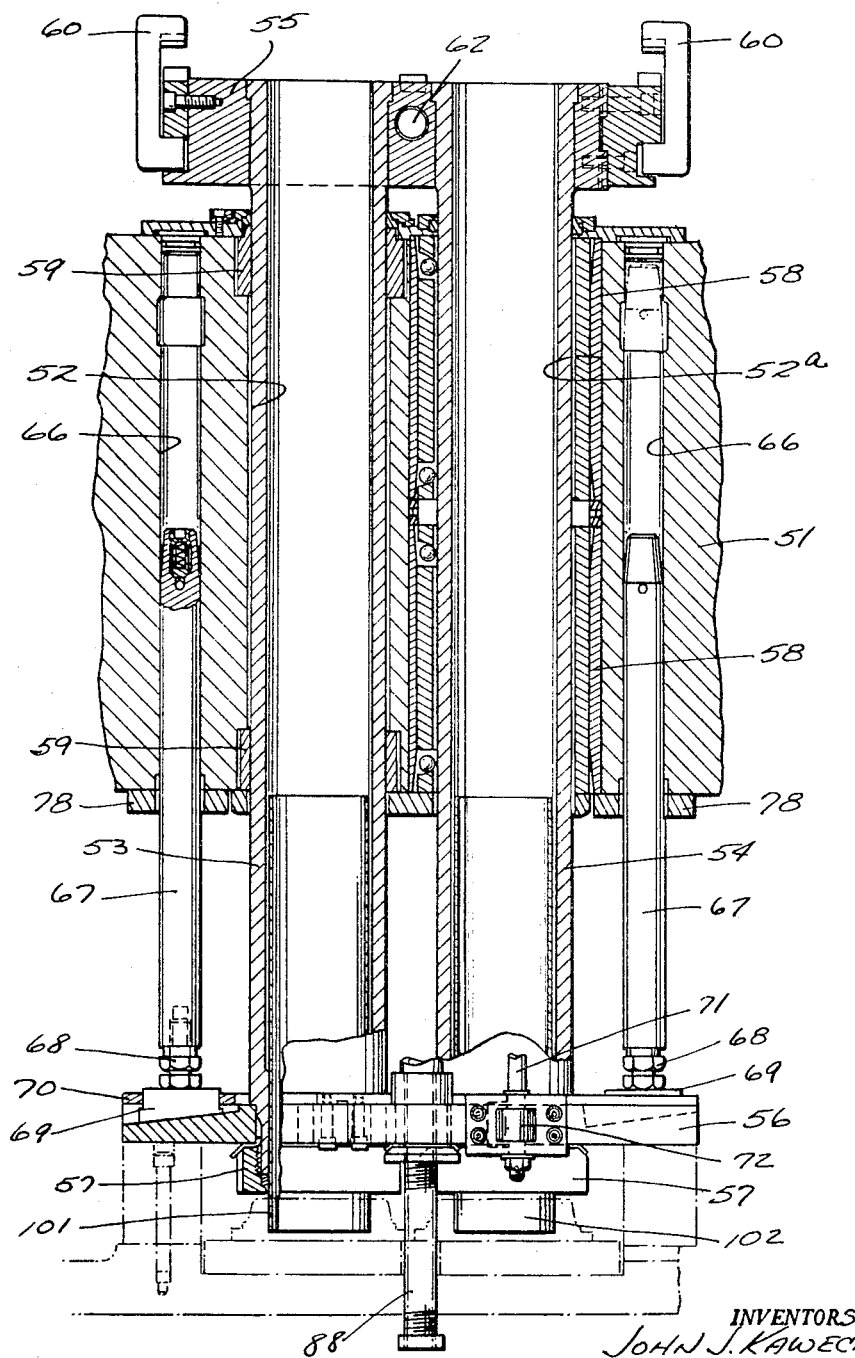

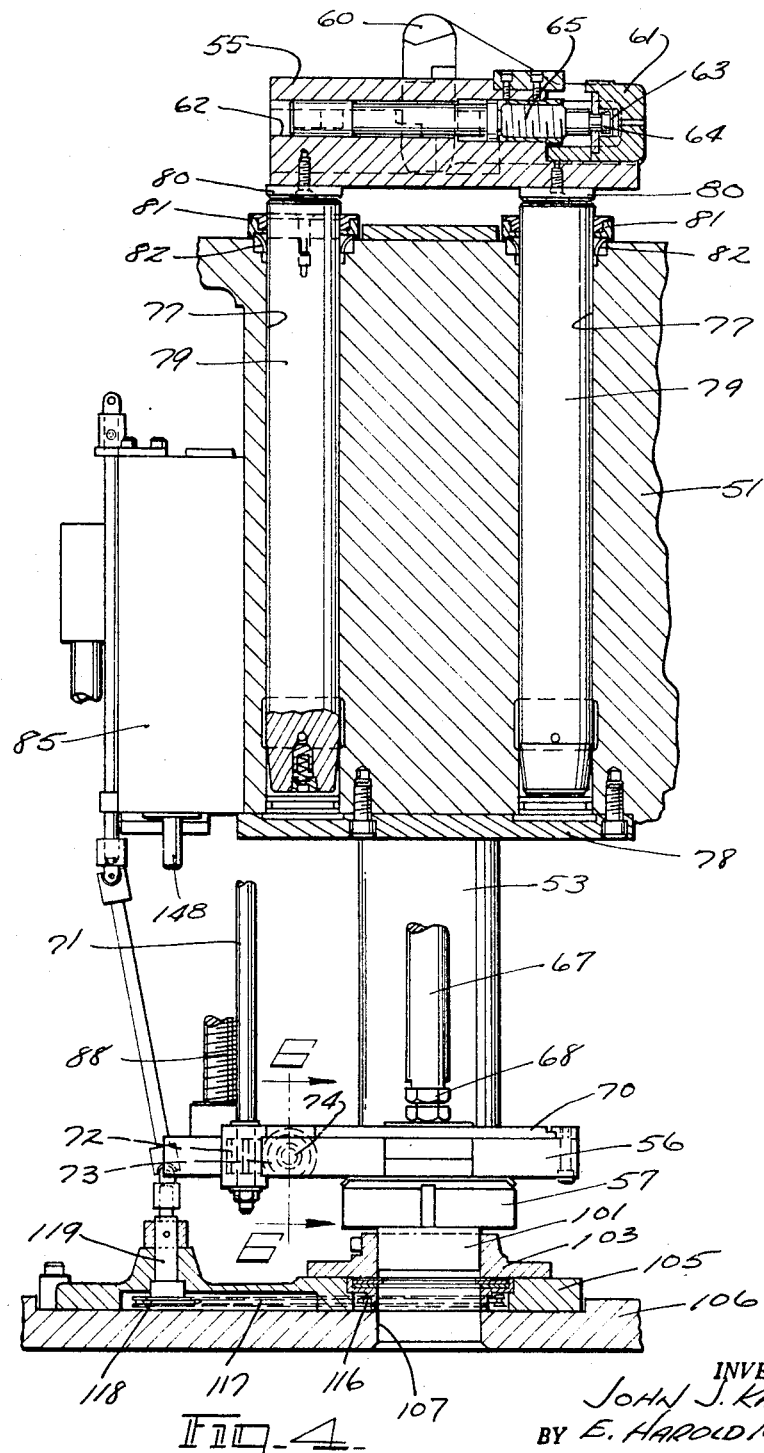

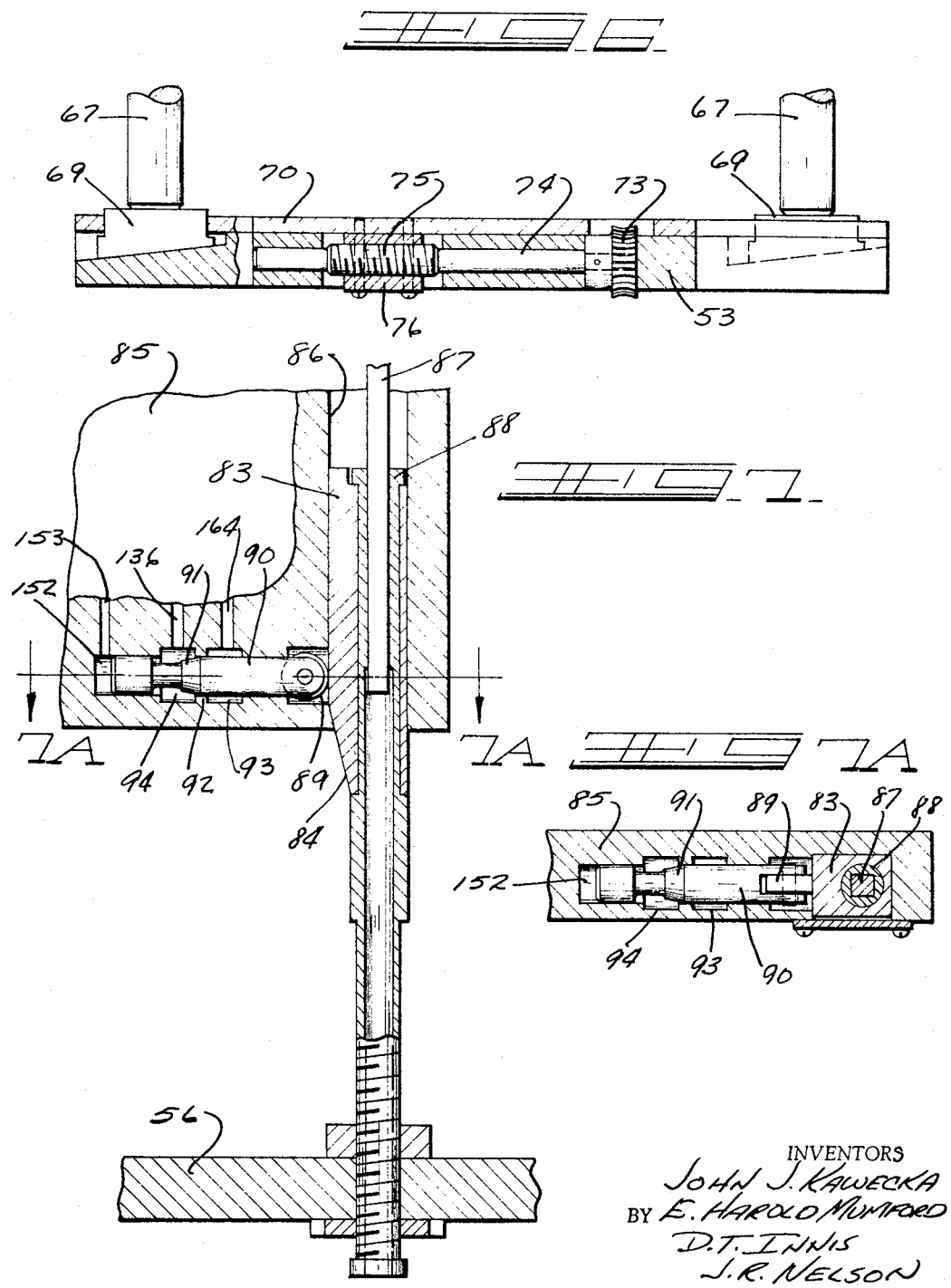

Aug. 23, 1966   J. J. KAWECKA ET AL   3,268,319
GLASSWARE PRESSING APPARATUS WITH HYDRAULIC CONTROL
Original Filed Nov. 14, 1960   6 Sheets-Sheet 6

INVENTORS
JOHN J. KAWECKA
BY E. HAROLD MUMFORD
D. T. Innis
W. A. Schaich
ATTORNEYS United States Patent Office 3,268,319
Patented August 23, 1966

3,268,319
GLASSWARE PRESSING APPARATUS WITH HYDRAULIC CONTROL
John J. Kawecka, Toledo, Ohio, and Eustace H. Mumford, Ottawa Lake, Mich., assignors to Owens-Illinois Glass Company, a corporation of Ohio
Original application Nov. 14, 1960, Ser. No. 68,919, now Patent No. 3,178,276, dated Apr. 13, 1965. Divided and this application Dec. 21, 1964, Ser. No. 434,155
4 Claims. (Cl. 65—160)

This application is a division of our co-pending application, Serial No. 68,919, filed November 14, 1960, now Patent No. 3,178,276.

This invention relates to an apparatus for forming pressed parisons or like articles. More specifically, this invention relates to a mechanism for positioning the parison or blank mold in operative relationship with respect to a neck mold.

In forming machines of the gob fed type wherein the parisons are pressed in an upright position and laterally transferred by neck molds to a position for blowing the parisons to final form, it is necessary to provide a mechanism for raising and lowering the blank molds. Considerable difficulty has been experienced in controlling the rate of movement of the blank molds into and out of pressing position and also in maintaining proper alignment between the parison molds and the neck molds. Furthermore, in order to provide for lateral transfer of the formed parison, it is necessary to lower the blank mold so that the top portion thereof will clear the bottom of the parison which is suspended from the neck molds. Most forming machines are adapted to make various sizes of ware and the parisons will necessarily be of correspondingly variable lengths. Because of this fact, it becomes advantageous to be able to adjust the lowest position reached by the parison molds when they are retracted. This will enable higher speeds of production of the ware through increased indexing speeds for the neck molds.

In forming parisons in the manner described above, the parison mold will become excessively hot unless efficient cooling means are provided therefor. Furthermore, better parisons may be formed when the degree of chill imparted thereto by the parison mold is controllable both as to final temperature of the parisons and the pattern of the chill.

It is therefore an object of this invention to provide a mechanism for positioning parison molds in pressing position and having a wide range of adjustability.

Other objects will be apparent from the following description taken in conjunction with the annexed drawings wherein:

FIG. 2 is a schematic top plan view of the parison mold supporting structure, with the parison molds removed;

FIG. 3 is a sectional elevation taken at line 3—3 on FIG. 2;

FIG. 4 is a sectional elevation taken at line 4—4 on FIG. 2;

FIG. 5 is a bottom plan view of the mechanism of FIG. 2;

FIG. 6 is a sectional elevation taken at line 6—6 on FIG. 4;

FIG. 7 is a sectional elevation taken at line 7—7 on FIG. 2;

FIG. 7a is a cross-sectional view taken at line 7a—7a on FIG. 7;

Figure 1:
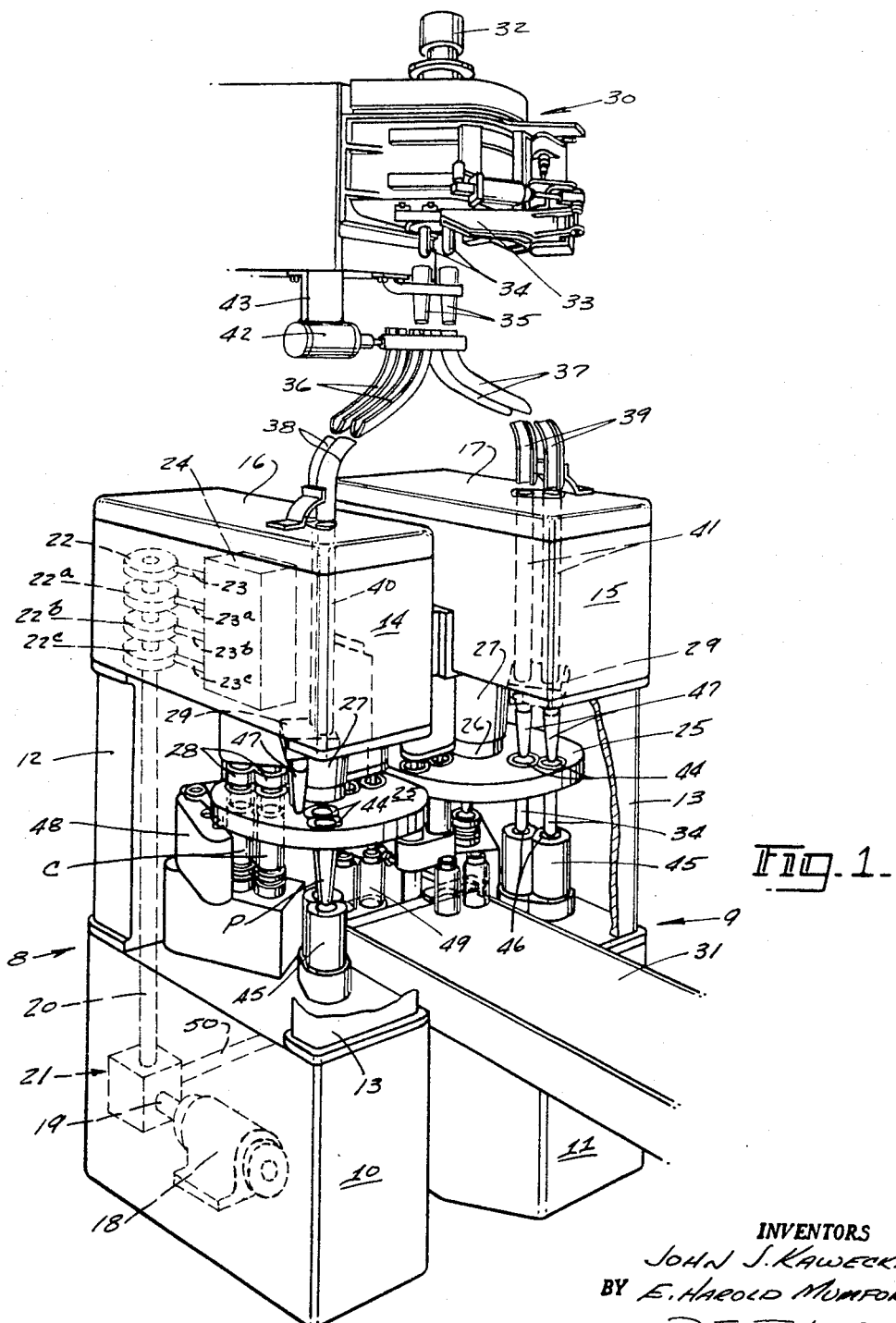
FIG. 1 is a perspective view in elevation illustrating a pair of forming machines beneath the gob feeding devices.

Referring to the drawings and in particular to FIG. 1, there is shown two forming machines 8 and 9. The machine 8 may be termed a "left-hand machine" and machine 9 a "right-hand machine" in that their neck mold carrying turrets operate in opposite directions. Machine 8 is supported by a base 10 and machine 9 is supported by a base 11. Extending vertically upward from said bases 10 and 11 are support columns 12 and 13 which are adapted to support upper frame structures 14 and 15 of the respective machines. The upper frame structures 14 and 15 have overlying cover members 16 and 17 for preventing the accidental instrusion therein of dirt or other foreign matter. The upper frame structures 14 and 15 enclose and contain the several driving mechanisms for various parts of each machine. A controllable constant speed motor 18 is mounted within the base 10 and has an output shaft 19 which drives through a gear box 21, a vertical drive shaft 20 extending upward through the vertical support member 12 and into the upper frame structure 14. The drive shaft 20 carries, on its upper end, a series of timing cams 22, 22a, 22b and 22c, mounted for rotation therewith. As the cams rotate, they engage axially movable cam followers 23, 23a, 23b and 23c, respectively, which extend into and are slidably received in a valve block 24.

The cam followers actuate valve members within the valve block 24 which control the supply of operating fluid to the various motor driven parts of the machine 8, such as the drive for a horizontally disposed turret 25, vertically movable blow heads 28 and plunger operating mechanism 29. The turrets 25 are mounted for rotation about a vertical axis defined by downwardly extending shafts 26 supported in bearing members 27 fixed to the undersurface of the upper frame structures 14 and 15. The machines 8 and 9 are designed and built as right-hand and left-hand units and are so positioned beneath the gob feeding devices 30. They are also positioned on opposite sides of a ware conveyor 31 which is adapted to receive the blown ware from both of the machines.

It should be noted that the turrets 25 are arranged to index in opposite directions but with their peripheral surfaces moving in the same direction at the takeout point over the ware receiving conveyor. The turrets 25 are indexed by a hydraulic drive mechanism, not shown, the details of which are fully disclosed in United States Patent No. 3,009,444 issued November 21, 1961, and assigned to the assignee of this application.

The gob feeding device 30, as illustrated in FIG. 1, is a well-known feeder and is comprised of the usual members such as the gob feeding plunger 32 and the cut-off device 33, which is adapted to simultaneously sever a pair of gobs 34 of molten glass. The gobs 34, after being severed, are guided in their travel to the machines 8 and 9 successively. Below and in axial alignment with the severed gobs 34 are a pair of fixed guide funnels 35 into which the severed gobs are dropped. The guide funnels 35 will direct the gobs into their upper ends of guiding members 36 and 37 depending upon which machine is to receive the gobs. For example, as shown in FIG. 1, the guide members 37 are in position with the receiving ends in axial alignment with guide funnels 35. As the gobs leave the guiding members 36 and 37, they are fed to deflector members 38 and 39 wherein the direction of travel of the gobs is changed so that when they leave the deflector members, they will be ready to drop vertically through pairs of vertically disposed gob guides 40 and 41 of the machines 8 and 9 respectively.

The guiding members 36 and 37 are connected together as a unit and are capable of being reciprocated so as to alternately place the guiding members in alignment with the guide funnels 35. Reciprocation of the guiding members is effected through the operation of a hydraulic cylinder motor 42 mounted on a bracket 43 connected to the underside of the gob feeding device 30.

The gobs 34, after entering the vertical gob guides 40 and 41, drop vertically through neck rings 44 which are positioned by the turret 25 beneath and in alignment with the lower ends of the gob guides. After passing through the neck rings 44, the gobs will fall into the open upper ends of the parison or blank molds 45 and thus become deposited in the cavities 46 within the parison molds 45. When the gobs have begun their travel through the guide members, the parison molds 45 are raised into contact with the neck rings 44 and, with the neck rings, form the complete parison mold cavity. When the gobs have reached the cavities 46 within the parison molds 45, the plunger mechanism 29 will be actuated to move plungers 47 horizontally into alignment with the neck rings 44. When the plungers are so aligned, they will be moved vertically downward to press the gobs 34 into the shape of parisons "P."

After the parisons have been formed, both the plungers 47 and the parison molds 45 are moved vertically away from the neck rings 44 so as to leave the parisons "P" suspended from the neck rings 44. With the parisons "P" suspended from the neck rings 44, the turret 25 is indexed to the left in the case of machine 8, thus bringing the parisons "P" into position to be blown into containers "C." The blowing of the parisons is accomplished by closing a double cavity blow mold 48 about the suspended parisons "P" and the introduction of blowing air through vertically reciprocable blow heads 28 which seat on the top surface of the neck rings 44 at the blowing station. After the containers "C" have been blown to final form, the turret 25 is again indexed to carry the containers to a takeout station 49 where through suitable handling mechanism, they are cooled and delivered to the conveyor 31.

While the timing motor 18 has been described as controlling the various operations carried out on the machine 8, it should be pointed out that this motor also, through a drive shaft 50 coupled to the motor output shaft 19, is adapted to drive a vertical valve operating cam shaft in the machine 9 in a manner similar to that described with respect to the operation of the cam mechanism of machine 8. Thus, the two machines 8 and 9 are tied together in their timing operations so as to be capable of operation together without interference of one with respect to the other. Furthermore, commercially available synchro-tie mechanism is used for coordinating the timing of machine operations with the timing of the operation of the feeder device 30.

The foregoing constitutes a general description of the operation of the machines of which the invention forms a part.

Referring now specifically to FIGS. 2 to 5, there is disclosed the details of the mechanism for raising and lowering the parison molds 45. FIG. 2 is a top plan view of the parison raising and lowering mechanism with the parison mold removed. This mechanism is housed in the bases 10 and 11 of both machines, it being understood that each machine has this specific mechanism individual thereto. For simplification of disclosure, the parison mold supporting mechanism will be described with respect to its arrangement in forming machine 8.

A main horizontal support structure 51, extending horizontally across the upper portion of the left-hand machine base 10 has a pair of vertical passageways 52 and 52a extending therethrough. Extending vertically through the passageways 52 and 52a are a pair of tubular fluid conducting members 53 and 54 adapted for vertical reciprocation with respect to the support member 51. The upper ends of the tubular members 53 and 54 are joined together by means of an upper crosshead 55 which serves as the main mounting and supporting member for the blank mold holder or cage 45. The lower ends of the tubular members 53 and 54 are also joined together by means of a lower horizontal crosshead 56 (see FIG. 5). The lower crosshead 56 is joined to the tubular members 53 and 54 by means of a pair of threaded locking nuts 57 which are threaded to the lower ends of the tubular members 53 and 54 and retain these members within openings in the lower crosshead 56.

The passageway 52, through which the tubular member 53 extends, has an internal diameter which is greater than the external diameter of the tubular members 53 in order to allow for expansion of the crosshead 55 from heat received from the parison mold 45 during operation of the forming machine 9.

The vertical passageway 52a through which the tubular member 54 is adapted to be reciprocated has an internal diameter substantially larger than the external diameter of the member 54. The clearance formed by the difference in diameter of the member 54 and the passageway 52a is taken up by a pair of axially aligned sleeve bearings 58 (see FIG. 3) which retain the tubular member 54 in fixed horizontal relationship with respect to the support member 51.

The passageway 52 through which the tubular member 53 extends is provided at the top and bottom with sleeve bearings 59 so as to provide substanially frictionless engagement between tubular member 53 and support 51. As can readily be seen, when the raising and lowering mechanism is in operation for any period of time, the upper crosshead 55 will become heated and since being made of steel, will tend to expand. Therefore, it is necessary to provide clearance between the tubular member 53 and the support 51 in order to prevent binding of the members 53 and 54 in the support 51 during actuation of the raising and lowering mechanism. This expansion is taken care of through the clearance provided between the tubular members 53 and the passageway 52. In order to provide proper orientation of the blank molds with respect to the cooperating neck molds, it is necessary that the blank raising and lowering mechanism have some portion thereof which is always traveling vertically in the same plane. Thus, the sleeve bearings 58 which surround the tubular member 54 restrain the tubular member 54 to precise vertical movement unaffected by thermal expansion of the crosshead 55. Thermal expansion of the crosshead 55 will therefore effect the lateral spacing of the two tubular members 53 and 54 but since the tubular member 54 is embraced by the sleeve bearings 58, expansion will only result in a lateral shift of the tubular member 53 within the passageway 52.

As previously stated, the upper crosshead 55 is adapted to support the parison mold holder 45 and to insure that the molds carried thereby are always positioned on the crosshead in the same relative position. A pair of C shaped clamps 60 are provided at opposite ends of a yoke 61 which may be moved longitudinally with respect to the upper crosshead 55. As best shown in FIG. 4, the crosshead 55 as a horizontal passageway 62 extending therethrough between the tubular members 53 and 54. The yoke member 61 lies in the same horizontal plane as the longitudinal axis of the passageway 62 and is provided at the center portion thereof with a recess 63 into which a stub shaft 64 is adapted to seat. The stub shaft 64 extends part way along the passageway 62 and is provided at its opposite end with a tool engaging configuration. Intermediate the ends of the stub shaft 64 is a threaded portion 65 adapted to engage internal threads provided within the passageway 62. Thus, it can be seen that by rotating the stub shaft 64 in one direction, it will result in a lateral movement of the yoke 61 which in turn will move the C shaped clamps 60 into clamping engagement with cooperating clamping surfaces of the parison mold. Also rotation of the stub shaft in the opposite direction will serve to release the C shaped clamps 60 from engagement with the parison mold holder 45. This then provides an easily and quickly operable arrangement for detachably connecting the parison mold holder to the crosshead 55. The main support member 51 is provided with an additional pair of vertical passages 66 (FIG. 3) which are closed at their top and serve as operating cylinders for a pair of pistons 67 mounted to reciprocate therein. The pistons 67, at their lower ends, are provided with adjusting screws 68, which are effective to change the length of the pistons. Inasmuch as the pistons 67 operate as a pair, it is necessary that they reach the upper portion of the stroke at the same instant. At the upper end of the stroke, they are snubbed by the entrapment of fluid between the ends of the pistons and the ends of the cylinders. The adjusting screws 68 thus provide an arrangement for insuring that the two pistons 67 will be snubbed at the same time. The pistons 67 abut the lower crosshead 56 through cam blocks 69 which are seated on tapered upper surfaces on the lower crosshead 56.

Application of fluid pressure to the passages 66 will result in downward movement of the pistons 67 and lower crosshead 56. Inasmuch as the lower crosshead 56 is connected to the upper crosshead 55 by means of tubular members 53 and 54, downward movement of the lower crosshead 56 will result in a lowering of the upper crosshead 55 as well. The extent of upward movement of the crossheads 55 and 56 is limited by the fact that the cam blocks 69 will contact the cover plate 78. The pistons 67 will be in the dotted line position shown in FIG. 3 when the crossheads are completely raised. Fine adjustment of the full upward movement of the crosshead may be adjusted by movement of the cam blocks 69 relative to the lower crosshead 56. Cam blocks 69 may be shifted by means of an apertured plate member 70 which overlies and is slidable relative to the lower crosshead 56 and in which cam blocks 69 extend through apertures formed therein.

With particular reference to FIGS. 5 and 6, shifting of the plate 70 is effected through rotation of a shaft 71 having a worm 72 on the lower end thereof, which is adapted to engage a worm wheel 73 fixed to a horizontal shaft 74. The horizontal shaft 74 is mounted for rotation within the lower crosshead 56 and at its end opposite the worm wheel 73 is provided with external threads 75.

Connected to the under surface of the plate 70 is a bracket 76 having internal threads which cooperate with the threads 75 on the shaft 74. Thus, upon rotation of the shaft 74, the bracket 76 is shifted axially of the shaft 74 resulting in shifting of the plate 70 relative to the lower crosshead 56. This shifting of the plate 70 results in lateral movement of the blocks 69 resulting in a fine adjustment of the blank mold height to effect the gap between the top of the blank molds and the bottom of the neck rings.

The horizontal support member 51 has a further pair of vertical passageways 77 therethrough which are closed at the bottom end thereof by means of a cover plate 78 bolted to the under surface of the support member 51. These passageways 77 serve as operating cylinders for a pair of pistons 79. The upper end of pistons 79 are in abutting relationship with a pair of plates 80 fixed to the under surfaces of the upper crosshead 55. Suitable sealing gaskets 82 are provided in surrounding relationship to the pistons 79 to prevent the escape of hydraulic fluid out of the passageways 77. In addition to gaskets 82, there are provided flexible annular piston wall wipers 81 which will also aid in preventing the passage of foreign particles into engagement with the sealing gaskets. The pistons 79 are of greater diameter than the previously described pistons 67 and serve as the means for raising crosshead 55. The introduction of fluid under pressure into the passageways 77, adjacent the lower ends thereof results in upward movement of the pistons 79 and consequent raising of both crossheads 55 and 56.

As can readily be seen when viewing FIGS. 3 and 4, during downward movement of the crossheads the pistons 79 will necessarily force hydraulic fluid from the cylindrical passageways 77. This exhausting fluid is controlled both as to rate and quantity of exhaust so as to provide control over both the rate of lowering the crossheads and the maximum downward movement thereof. The downward movement of the crossheads is adjusted depending upon the length of the parisons being formed. It is only necessary to lower the cross-head a sufficient amount to provide clearance between the upper surfaces of the parison mold holder 45 and the bottom of the parisons. The control and adjustment of the downward movement of the parison mold carrying crosshead is effected through control of the hydraulic fluid exhaust from the passageways 77.

With specific reference to FIGS. 7 and 7a, there is shown an adjustable valve actuator which takes the form of a cam element 83, rectangular in cross-section and provided with an inwardly tapering cam surface 84. The cam element 83 is adapted to slide vertically with respect to a valve housing 85 carried in fixed position with respect to the support member 51. The valve housing 85 is provided with a rectangular elongated cut-out portion 86 within which the cam element 83 is adapted to slide vertically. Extending downwardly throughout the length of the cam element 83 is a square shaft 87. The shaft 87 is mounted within the support structure 51 in such a manner as to be capable of being rotated to adjust the position of cam element 83 with respect to the crossheads 55 and 56. As can be seen in FIG. 7, the cam element 83 has a cylindrical bore within which fits a cylindrical spool member 88 having a square bore therethrough. The cylindrical member 88 is attached to the lower crosshead 56 by means of cooperating threads so as to be vertically adjustable within the crosshead 56 by relative rotation. Cylindrical member 88 is rotated through rotation of square shaft 87 which is telescoped therein. Thus, by rotating the shaft 87, the cylindrical member 88 will be screwed into or out of the lower crosshead 56 and will carry with it, the cam element 83.

Adjustment of the cam element 83 in a vertical direction will determine the extent to which the crossheads are lowered during the operation of the machine. Upon retraction of the lower crosshead 56, the cylindrical member 88 will carry the cam element 83 downwardly through the rectangular slot 86 in the valve housing 85 and during its downward travel the cam surface 84 will engage a roller 89 connnected to a horizontally slidable valve element 90. The valve element 90 is mounted for sliding movement within the valve housing 85 and upon movement to the left from the position shown in FIG. 7, will present a tapered cylindrical surface 91 thereof, within a restricted portion 92 in the valve housing 85. The valve housing 85 has a pair of annular chambers 93 and 94 formed on either side of the restricted portion 92 in surrounding relationship to the valve element 90. The fluid exhausting from the cylindrical passages 77 enters the chamber 93 and exhausts from the valve housing by way of chamber 94. Thus it can be seen that when the tapered portion 91 is of the valve 90 is moved to the left, the passage of fluid from the chamber 93 to the chamber 94 is gradually cut off. This gradual cut-off serves to snub the downward movement of the crossheads at the end of their downward travel and continued movement of the valve 90 to the left will completely cut off the exhaust from the passageway 77 and stop the downward movement of the crossheads. The complete hydraulic circuit and control functions thereof will be described in greater detail hereinafter with reference to FIG. 8.

The operation of the various mechanisms at the pressing station will now be described with reference to the schematic diagram, FIG. 8.

Figure 8:
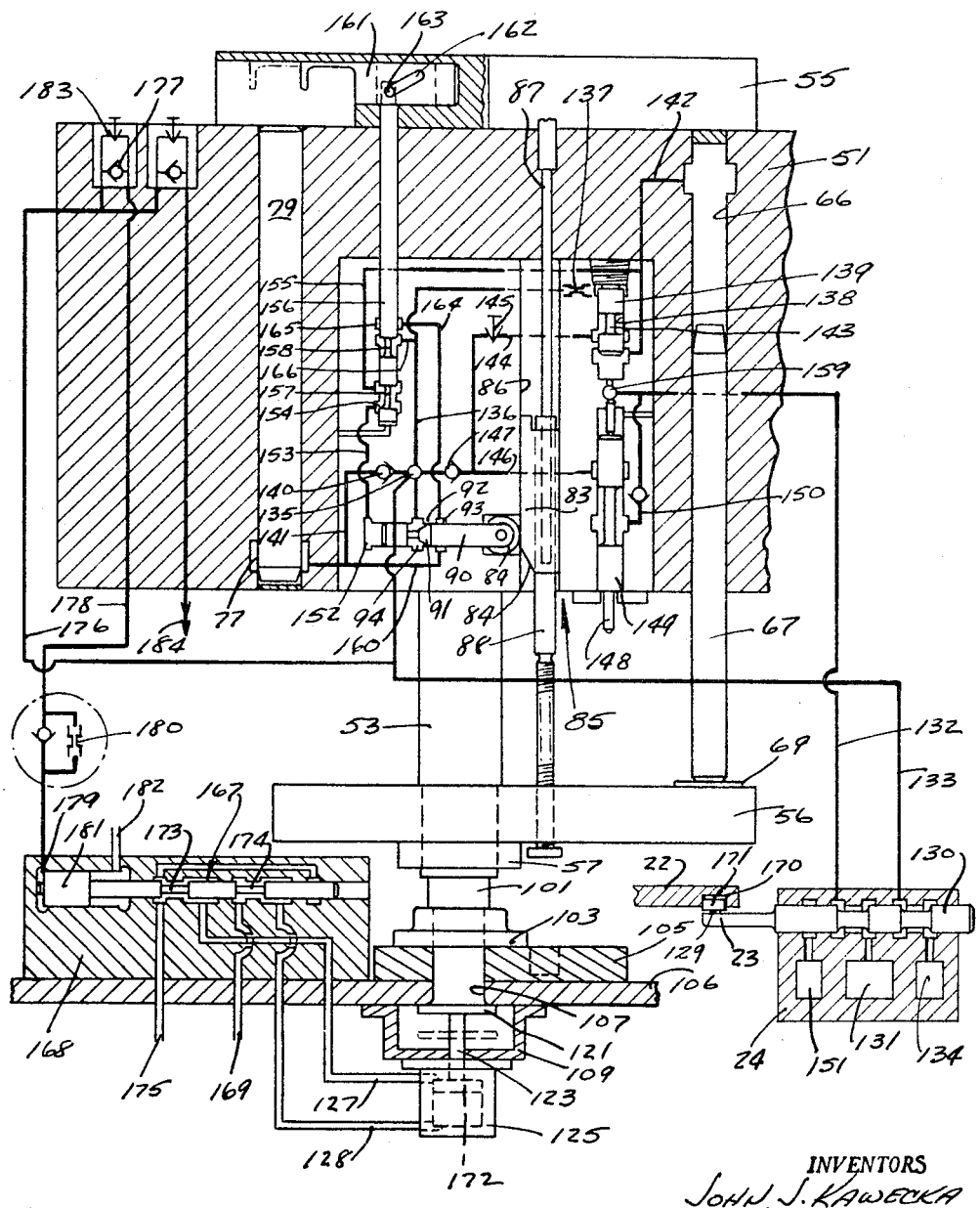
FIG. 8 is a schematic diagram of the hydraulic system for controlling the operation of the mold supporting structure.

At the right side of FIG. 8, there is schematically shown a portion of cam 22 having an undercut slot 170 in the lower surface thereof in which a roller 171 is adapted to ride. Roller 171 is connected by a pin 129 to cam follower 23 which in turn is connected to a spool valve 130. Rotation of cam 22 will result in reciprocatory movement of the spool valve 130 in the valve block 24. The spool valve 130 is effective to apply fluid under pressure from a pressure chamber 131 alternately to two conduits 132 and 133. For example, as shown in FIG. 8, chamber 131 is in communication with conduit 132 while conduit 133 is in communication with an exhaust chamber 134. In this position delivery of fluid under pressure to conduit 132 will result in a downward movement of the crosshead 56 to the position shown.

A description now will be given of what occurs when spool valve 130 is shifted by cam 22 to the left, as viewed in FIG. 8.

Hydraulic fluid or oil under pressure will flow from the chamber 131 into conduit 133 and then a junction point 135 wherein the fluid divides and flows in two directions. From the junction point 135, oil flows through a conduit 136 and a flow restrictor 137 to the top of a chamber 138 resulting in forcing a piston 139 downward. At the same time, oil is flowing from the junction point 135 past a check valve 140 in a conduit 141 which opens into passageway 77, forcing the pistons 79 in an upward direction. As the piston 79 moves upward, raising the crossheads 55 and 56, oil that is trapped in passageways 66 will be forced therefrom by upward movement of the pistons 67. This oil will flow out through a conduit 142 past an undercut portion 143 of the piston 139 and through a conduit 144. In the conduit 144 is a throttle valve 145 for controlling the rate of flow of fluid from passageway 66, thus controlling the rate of upward movement of crossheads. After passing the throttle valve 145, the oil flows from conduit 144 to conduit 146, through a check valve 147 to the junction point 135, where the oil will be utilized for raising the pistons 79.

As previously explained, the diameters of the two pistons 67 and 79 (actually pairs of pistons 67 and 79) are different, with the diameter of pistons 67 being less than that of pistons 79. Therefore, the pressure in passageway 66 will be at a higher level than that in the passageway 77. This pumping of oil from the passageway 66 to the passageway 77 results in a saving of oil on the upstroke, thus requiring the use of a relatively small capacity pump for supplying fluid under pressure to chamber 131 to effect upward movement of the crossheads. At the end of the upstroke, the lower crosshead 56 will strike a downwardly extending pin 148 attached to a vertically movable valve 149. The upward movement of the valve 149 will connect conduit 146 to conduit 150 which is connected to conduit 132. At this time, conduit 132 is connected to exhaust chamber 151 in the valve block 24. Thus, it can be seen that oil flowing from the passageway 66 will be exhausted through conduits 144 and 146, 150 and 132. When the oil from passageway 66 goes to exhaust, there is no downwardly directed force on the crossheads and the available fluid pressure from chamber 131 will be fully utilized to maintain the crossheads in their upper position.

As the lower crosshead 56 is raised, it carries with it cylindrical member 88 and the cam element 83 which will slide vertically in the slot 86. The square shaft 87 during upward movement of the cam element 83 and cylindrical member 88, will telescope within the cylindrical member 88. As the cam element 83 moves vertically, the roller 89 will move to the right, as viewed in FIG. 8, following the cam surface 84 and move the valve element 90 to the right. The valve element 90 and roller 89 are biased toward the right by the introduction of fluid under pressure to a chamber 152. Pressurized fluid reaches the chamber 152 through conduit 153, a valve chamber 154 and a conduit 155 which is connected to conduit 142. Thus, the valve 90 will move to the right upon upward movement of the lower crosshead 56. Within the valve chamber 154 is a manually shiftable spool valve 156 having two undercut portions 157 and 158, with the portion 157 being positioned in the previously mentioned chamber 154.

In order to retract the crossheads 55 and 56, the spool valve 130 is positioned as shown in FIG. 8, with the conduit 132 connected to pressure chamber 131 and conduit 133 is connected to exhaust chamber 134. Fluid under pressure will be delivered through conduit 132 to junction point 159 and beneath piston 139 causing the piston to be raised to the position shown in FIG. 8. With the piston 139 in the position shown, oil will flow into conduit 142 connected to the passageway 66 and resulting in forcing piston 67 in a downward direction. As the piston 67 moves downwardly, it forces lower crosshead 56 down and by reason of the connection of tubular members 53 and 54, will also force the upper crosshead 55 downward. As the upper crosshead 55 moves down, it will force piston 79 downwardly in passageway 77. The fluid within passageway 77 is forced out through a conduit 160 and into chamber 93 surrounding valve 90.

At this time, the valve 90 is positioned to the right and allows the fluid in chamber 93 to flow into chamber 94 which is connected to junction point 135. After the fluid has reached the junction point 135, it will flow through conduit 133 to the exhaust chamber 134. As the crossheads 55 and 56 move downwardly, the lower crosshead 56 will bring the cam element 83 downward and as the cam surfaces 84 engage the roller 89, the valve 90 will be moved to the left, as is viewed in FIG. 8.

At this time, the flow of fluid from the chamber 93 to chamber 94 will be snubbed by the tapered surfaces 91 of the valve element 90. Further downward movement of cam element 83 shifts the valve element 90 to completely cut off communication between chambers 93 and 94, thus trapping fluid within the passageway 77 and preventing further downward movement of the crossheads 55 and 56. Thus, it can readily be seen that vertical adjustment of the cam element 83 relative to the lower crosshead 56 will determine the extent of retraction of the crosshead 55 which carries the parison mold holders 45. Whenever it is desirable to have constant full retraction of the crossheads 55 and 56, the valve 156 is shifted manually by moving a slide 161 to the left. Slide 161 carries an annular slot 162 within which a pin 163 will ride. The pin 163 is connected to the upper end of valve 156. The upward shifting of valve 156 will allow fluid exhausting from the passageway 77 to flow from chamber 93 through a conduit 164 connected to a chamber 165 through which valve 156 is movable. The oil will flow from chamber 165 past an undercut portion 158 of valve 156 to the junction point 135 through a conduit 166.

The admission of cooling air to the tubular members 53 and 54 is under the control of a spool valve 167 which is slidable in a valve block 168. The spool valve 167 will regulate the admission of air from supply conduit 169 alternately to conduits 127 and 128, and alternately shift the piston 172 of the motor 125. This shifting of the piston 172 will result in forcing the valve body 121 either into or out of sealing engagement with the opening 107 in the base member 106. As shown in FIG. 8, the spool valve 167 has two undercut portions 173 and 174 with the undercut portion 174 providing the clearance for fluid to pass from the supply line 169 to either conduits 127 or 128 depending upon its shifted position.

The undercut portion 174 of spool valve 167 will control the admission of air from inlet 169 to conduit 128 while at the same time undercut portion 173 allows conduit 127 to be exhausted through an exhaust port 175. Shifting of the valve 167 to the right will have the effect of connecting inlet 169 to conduit 127 by way of the undercut portion 173 of the valve 167. At the same time conduit 128 will be connected to exhaust through exhaust port 175 by way of undercut portion 174 of the valve 167.

As shown in FIG. 8, the spool valve 167 is in the position shown during retraction of the crossheads 55 and 56. At this time the cooling air within plenum chamber 109 is prevented from entering the sleeve 101. When the main cam controlled spool valve 130 is shifted to the left for admitting oil under pressure to conduit 133, oil under pressure is also fed through a conduit 176 which is connected through a check valve 177 to an inlet conduit 178. The conduit 178 is connected to a chamber 179 at one end of the valve 167, through a flow restrictor 180 and results in shifting the spool valve 167 to the right.

As shown in FIG. 8, the spool valve 167 is moved to the right by the introduction of oil under pressure to the chamber 179. Within the chamber 179 is a piston member 181 which is integral with the spool valve 167. When the main cam controlled spool valve 130 is shifted so as to introduce oil under pressure to line 132, for effecting the downward movement of the crossheads 55 and 56, the other conduit 133 leading to the valve 174 is connected to exhaust port 134 at the same time the left-hand end of chamber 179 will also be connected to the exhaust side of the main valve block 24. The piston 181 is normally biased toward the left by a constant pressure source connected through a conduit 182 to the right-hand end of the chamber 179. This will effect return of the piston to the left and the fluid trapped within the chamber 179 will be exhausted through the line 178 and through a needle valve 183 which is connected in parallel with the check valve 177 and then by way of the conduit 176 to conduit 133 and to the exhaust chamber 134.

While the above description has been limited to the cycling of coolant to the sleeve member 53, it should be understood that there is a duplicate system for controlling the communication of coolant to the sleeve member 54. This duplicate system is connected to a line 184 which leads to a spool valve similar to the valve 167 shown in FIG. 8. The functional relationship of this pilot valve to the mechanism for raising and lowering the blanks will be the same as that of valve 167.

Thus it can be seen that applicants have provided apparatus capable of raising and lowering the blank or parison molds at the parison forming station which is capable of a high degree of flexibility both as to cooling of the molds themselves and to the mechanics involved in raising and lowering the blank mold. The range of adjustability of the extent of retraction of the blank molds after the parisons have been pressed is advantageous from the standpoint of the speed of operation of the forming machines disclosed herein.

Modifications may be resorted to within the spirit and scope of the appended claims.

We claim:

1. Apparatus for elevating and retracting a dual parison mold carrying crosshead; comprising an upper horizontal crosshead adapted to support a pair of parison molds on the upper surface thereof, a main support structure, said support having a plurality of cylindrical passages extending vertically therethrough, means closing the lower end of a first two passages, a first pair of pistons slidably received in said two passages and having their outer ends extending above the support structure, means closing the upper end of a second two passages, a second pair of pistons slidably received in said second passages and having their outer ends extending below the support structure, a lower crosshead below said support structure, means connecting said two crossheads together, a source of hydraulic fluid under pressure, first conduit means connecting said source to the closed ends of said first passages for moving said first pistons vertically upward to raise said crossheads, second conduit means connecting said source to the closed ends of said second passages, said first and second conduit means being alternately connected to said source in timed sequence, third conduit means connecting said second passages to said first passages when said first conduit means is connected to said source, the effective area of said first pistons being greater than said second pistons, throttling means interposed in said third conduit means for regulating the rate of flow of hydraulic fluid from said second passages to said first passages, valve means controlling communication between said first and said third conduit means, means responsive to a predetermined vertical movement of said crossheads for moving said valve means to establish communication between said first and third conduit means, and means for exhausting said first passages when said source is connected to said second passages, whereby the volume of fluid used in raising said crossheads is the difference in piston-swept volumes between said first passages and said second passages requiring but a relatively small volume pump to effect operation.

2. The apparatus as defined in claim 1, further including the adjustable stop means on the lower crosshead for adjusting the height of the blank cage when raised and mechanical means connected to said stop means for making such adjustment.

3. The apparatus as defined in claim 1, wherein said means for exhausting fluid from said first passages when said source is connected to said second passages, comprises a spool valve normally positioned so as to allow fluid to exhaust therepast to an exhaust line and means for moving said spool valve to cut off said exhaust passage upon movement of said crossheads to a predetermined lower position.

4. The apparatus of claim 3, wherein said means for moving said valve comprises a cam, means for adjustably connecting said cam to one of said crossheads and movable therewith, said cam engaging said spool valve during movement thereof.

References Cited by the Examiner

UNITED STATES PATENTS

| 1,130,918 | 3/1915 | Miller | 65—160 X |
| 1,995,653 | 3/1935 | Rowe | 65—159 |
| 2,837,872 | 6/1958 | Brymer | 65—159 |
| 2,903,824 | 9/1959 | Denman et al. | 65—317 X |

FOREIGN PATENTS

| 559,368 | 3/1957 | Italy. |

DONALL H. SYLVESTER, *Primary Examiner.*

F. W. MIGA, *Assistant Examiner.*